(12) United States Patent
Branzell et al.

(10) Patent No.: US 7,945,940 B2
(45) Date of Patent: May 17, 2011

(54) SECURITY RATING METHOD

(75) Inventors: Jan Branzell, Karlstad (SE); Mikael Gustafsson, Karlstad (SE); Anders Rodrick, Karlstad (SE); Lorentz Lundmark, Karlstad (SE)

(73) Assignee: Veriscan Security Aktiebolag, Karlstad (SE)

( * ) Notice: Subject to any disclaimer, the term of this patent is extended or adjusted under 35 U.S.C. 154(b) by 961 days.

(21) Appl. No.: 10/381,000

(22) PCT Filed: Sep. 21, 2001

(86) PCT No.: PCT/EP01/10970
§ 371 (c)(1),
(2), (4) Date: Jul. 25, 2003

(87) PCT Pub. No.: WO02/29527
PCT Pub. Date: Apr. 11, 2002

(65) Prior Publication Data
US 2004/0021665 A1    Feb. 5, 2004

Related U.S. Application Data

(60) Provisional application No. 60/290,593, filed on May 11, 2001.

(30) Foreign Application Priority Data

Sep. 21, 2000    (SE) .................................. 0003378

(51) Int. Cl.
*G06F 17/00*    (2006.01)
(52) U.S. Cl. ............................................................. 726/1
(58) Field of Classification Search ................... 726/22, 726/23, 24, 25
See application file for complete search history.

(56) References Cited

U.S. PATENT DOCUMENTS

| | | | | |
|---|---|---|---|---|
| 5,440,498 | A | * | 8/1995 | Timm ........................... 340/541 |
| 6,950,944 | B2 | * | 9/2005 | Yager et al. ...................... 726/1 |
| 7,552,480 | B1 | * | 6/2009 | Voss ............................... 726/25 |

OTHER PUBLICATIONS

John W. Lainhart IV, COBIT: An International Source For Information Technology Controls, 1998-2000, ISACA, pp. 1-9 http://www.itgi.org/Template.cfm?Section=Home&CONTENTID=37336&TEMPLATE=/ContentManagement/ContentDisplay.cfm.*

* cited by examiner

Primary Examiner — Nasser Moazzami
Assistant Examiner — Daniel L Hoang
(74) Attorney, Agent, or Firm — Plumsea Law Group, LLC

(57) ABSTRACT

Security rating method and a graphical tool for decision making especially for setting priorities which tool comprises at least one diagram (1) having a first scale (2) which reaches in a first direction along a first axis (3), at least a first (4) and a second (5) potential action fields the identified value of which (4a, 4b) is graphically represented on said first scale (2) in said diagram (1) whereby a second scale (6) is arranged along said first axis. Said second scale (6) reaches in an opposite direction to said first scale.

13 Claims, 6 Drawing Sheets

|  | Veriscan 1 | Veriscan 2 | Veriscan 3 | Veriscan 4 | Veriscan 5 |
|---|---|---|---|---|---|
| Logical Security | Interviews | Interviews Control interviews Document analysis | Interviews adopted Document analysis | Interviews adopted Document analysis | Interviews adopted Document analysis |
| Physical Security | Interviews | Interviews Inspections | Interviews Inspections | Interviews Inspections | Interviews Inspections |
| System Security | Interviews | Interviews Document analysis Standard system check | Interviews Document analysis Adopted system check | Interviews Document analysis Full system check | Interviews Document analysis Full system check |

Table 2b

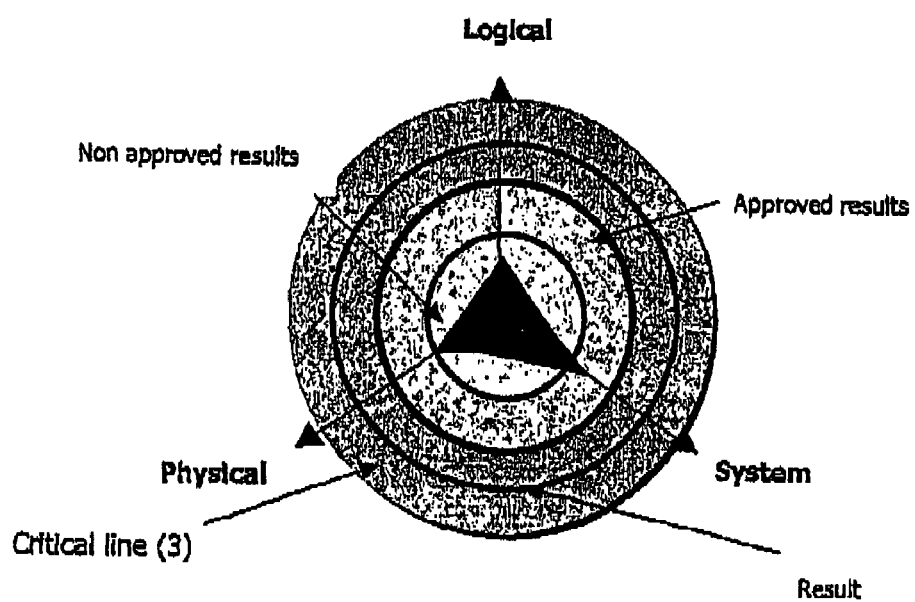

Fig 4a

SECURITY RATING METHOD

This application is a national stage application of international Application No. PCT/EP01/10970, filed Sep. 21, 2001, and claims the benefit of U.S. Provisional Patent Application Ser. No. 60/290,593, filed May 11, 2001, and Sweden Application No. 0003378-7, filed Sep. 21, 2000, all of which are herein incorporated by reference in their entirety.

TECHNICAL FIELD

Traditionally, when mentioning computer security, IT-security has been the most commonly used concept. When we say IT-security we usually mean technical aspects of computer security. Up to this date it is traditionally where most of the work has been concentrated the past few years.

By stating the notion Information Security we actually mean a larger part of the computer security. Information Security does not only cover the technical aspects, but also the administrative and physical aspects. The administrative aspects cover the routines and documentation while the physical aspects cover the buildings and storage of the computers and their information. The Information Security notion cover more areas and more than just the technical aspects.

Everybody knows what good Information Security level is, or at least we have an idea about what the market says is a good level. The level of Information Security that we adopt today is usually based on what we have to protect. If we have a lot of classified information, we have demands of a high Information Security level. If our information is open to everybody, we are usually satisfied with a lower level. But how can we know which level that is appropriate?

What is needed, is a way to express this level of Information Security and invent a new way of factors and definitions, a "common language". A company A which is going to connect their network to company B needs a way to know that their Information Security level is similar, or at least similar in some specific areas. We need a way to measure the Information Security level at companies A and B, and a method to compare the levels. Company A and B may be operating under different regulations or different legislation, depending on their branch of trade.

We also need a method to cover this situation. Companies A and B will be able to use the method according to the invention to communicate their needs between each other.

But how can Information Security levels be measured? To measure using statistics is one way by sampling values and construct definitions. This is difficult because there is nothing to compare against. The other way to measure is using a relative method. We can say that one protection or implementation is better than another. To use a relative method to measure Information Security forms the basis of the method for rating according to the present invention.

BRIEF DESCRIPTION OF THE INVENTION

The relative method according to the invention is based on performing measurements on specific Information Security issues within an organisation. These issues are called checkpoints. All checkpoints are divided into three information security areas: logical, physical and system security. A fourth area could be added, cf. below. Logical security cover administrative aspects like polices and guidelines with a perspective on the personnel. Physical security cover all the facilities while system security cover the IT-systems themselves.

The method according to the invention states a norm level for Information Security which is based on the current market situation. This norm is formed by current standards and recommendations for Information Security. The various information sources which are used to construct the norm level within the method is together called the information set. All demands and appliances are derived from the information set to form the norm level.

From the norm level, four other levels are created in the described example. This is made to meet the need for different types of information security levels and requirements. Two lower levels are created from the norm which generally have a smaller amount of checkpoints and the demands are less strict. Above the norm two higher levels are created which generally have a larger amounts of checkpoints and the demands are stricter. Measurements can be performed towards each level by doing analysis and inspections on the three information security areas.

During the analysis and inspections each checkpoint is given a grade. The grade is given on scale which generally indicate the fulfillment towards the demand on the specific checkpoint. When each checkpoint has been given a grade several results are calculated. The mathematical operations to calculate the results consider several organisation properties. To consider the properties when calculating the results within the method is vital to be able to use the results between organisations. The consideration to properties ensure that each result is comparable between organisations.

If the results indicate that the organisation has passed the analysis, a certification organisation has the right to issue a certificate. The certificate will state which level that is passed and the results in each area.

The described method will be developed into new versions to meet the ever changing needs and demands within the information security area. A new version will change demands, add checkpoints and reconstruct the analysis. When to issue a new version is governed by the availability of new sources if information like new legislation, new security techniques, a change of social behaviours etc.

The analysis according to the method is supported by a software tool. This tool can also perform all the result calculations and present the results. Organisations may use the tool to perform the analysis themselves, but in that case the result calculations are locked out. This is because the method must be controlled by one party to insure that results are coherent and thus possible to compare.

DETAILED DESCRIPTION OF THE INVENTION

The rating method according to the invention will now be described more in detail. First certain definitions and abbreviations will be elucidated. Then follows a part describing the results obtained by means of the method according to the invention.

Definition of Roles

A certain terminology is used in the description of the method, e.g. for defining organisation specific parts and their context. There are also definitions used for the organisation performing the measurement.

| | |
|---|---|
| Entity | The actual organisation that is subjected to the information security measurement |
| Entity Owner | This is the overall responsible function for Information security at the Entity or within a group of entities that shares information |
| Rating | The Independent organisation that conducts the rating |

-continued

| | |
|---|---|
| Reviewer | measurement process. This is also the license company that gets the license to use the method, license taker. (ref. To as Reviewer) |
| Reviewer team | The Independent organisation team which always should at least consist of three persons. Each person should have his or her major knowledge within some of the three information security areas. |
| License Provider | provides the license and also has the basis for determine the final results (result method part). |
| Client | The person/function at the Entity owner that has ordered the rating. |

Method Areas—Definition of Information Security

Within the method, three areas are defined on which to perform the measurements. These areas are:

| | |
|---|---|
| Logical Security | Administrative information security like policies, guidelines etc. Logical security focuses on personnel and documentation within the organisation measured. |
| Physical Security | Information security regarding facilities, fire and burglar protection etc. Physical security focuses on the personnel as well as the facilities within the organisation measured. |
| System Security | Information security regarding network, operating systems and applications. System security focuses on personnel, and the level of IT-systems' technical security within the organisation measured. |

Definition of Measurement Levels

The basis and uniqueness for the method are the pre-set levels of information security. The levels are derived form a predefined scale and a norm set as level 3. A higher number on the scale equals a larger set of information security analysis. A higher number on the scale also represents a higher set of demands to be fulfilled. Present levels of the concept using the method are:

| | |
|---|---|
| Veriscan 1 | Controlled Information Security |
| Veriscan 2 | Information Security Aware |
| Veriscan 3 | Market adapted Information Security (current market norm) |
| Veriscan 4 | High Information Security |
| Veriscan 5 | Very High Information Security |

Demands are relatively set from a standard level (norm). The middle level within the total number of levels represents the norm. From the norm level, lower levels and higher levels are set. In the five levels shown above in this example, the norm is based at level 3 (Veriscan 3). The norm is derived from demands set by dependant and independent organisations through standards, guidelines and policies. Other market demands within the information security area also have impact on the construction of the norm level. The middle level will always be named "Market adapted Information Security" to reflect the level of demands that are put onto organisations, both in amount of demands and the level of demand fulfilment.

The statement above provides that the levels described always must be developed to meet the market demands within the Information Security Area. This also means that each level must have it's own version number of method used. The version number describes future developments of the method.

Definition of Information Set

In order to set and develop the different levels information is gathered from various sources. In this example the following is a list of such sources:

National and international standards, such as BS7799, SS627799, ISO17799 etc.

Military standards, such as FA22 and various DoD standards

Internet Standards—RFC's

Legislation, national and international

Company specific standards or guidelines

National and international standardisation committees

Various information security methods and guidelines

Various information security literature

Physical security standards and recommendations

Several of the information sources mentioned above contain information that is similar or identical to information from other sources on the list. Several books include the topics covered within standard from another point of view. Information about information security within literature has more often a more aggressive approach towards problems covered. This approach is used within the method to further develop the various version numbers of a level.

Definition of Method Terminology

Each information security area (Logical, Physical and System) is divided into measurement categories. The categories reflect certain sub areas within an information security area. A category is further divided into checkpoints. The checkpoints are the actual measurements performed by analysis, interviews, inspection or tests etc. The definitions are stated as follows:

| | |
|---|---|
| Level | The actual rating level measured, e.g. Veriscan 1 to 5 |
| Area | The three Information security areas; Logical, Physical and System |
| Category | A service or specific part in the organisation Information security |
| Checkpoint | A specific function within a category |

The connections between these definitions can also be viewed in FIG. 2.a.

Definition of Method Weights

The method consists of weights used during calculations of the results in the method result part. The weights are used within the method to solve the following problems:

Which type of entity is measured?

Who is the person respondent answering questions during interviews (his or hers responsibility)?

How many of the entity personnel are going to be interviewed?

Who is the person from the license provider doing the actual measurement?

What is the current level of threats against the measured entity?

What is the consequence on a specific resource?

What is the probability that some thing happens on some information resource?

Is a checkpoint generally more important than another one?

Is a category generally more important than another one?

What are the general efforts that the entity has to mobilise to solve an information security problem?

Each weight is explained in the following.

Threat Weight:

The threat weight represents a general level of threat against the checkpoint measured within a scale from 1 to 5. A higher threat weight represents a high threat and a lower weight represent a low threat. The actual threat weight on a specific checkpoint is deduced from a generalisation performed by the license provider.

Probability Weight:

The probability weight represents a general level of probability that a certain action will be fulfilled if the threat on the checkpoint is activated on a scale of 1 to 5. A lower weight represents a low probability and high weight represents a high probability. The actual probability weight on a specific checkpoint is deduced from a generalisation performed by the license provider.

Consequence Weight:

The consequence weight represents a general level of consequence for the entity measured if both the threat and probability of checkpoint has activated on a scale of 1 to 5. A lower weight represents a low consequence and high weight represents a high consequence. The actual consequence weight on a specific checkpoint is deduced from a generalisation performed by the license provider.

Checkpoint Weight:

By adding the threat, probability and consequence weights to each other and divide with the numbers of factors used, a factor called the checkpoint weight is created. The checkpoint weight represents the importance of the checkpoint towards other checkpoints.

Category Weight:

A set of checkpoints form a category. The category weight is like the checkpoint weight built on three factors: threat, probability and consequence. There is a major difference between the checkpoint weight and the category weight in the manner that the actual category weight can be derived from two different aspects. The first type of category weight is derived from a generalisation on the three factors threat, probability and consequence. This generalisation is performed during measurement setup in discussions with the entity owner.

The other type of category weight is derived from a mean value from all the checkpoints threat, probability and consequence factors.

Which approach that is used is decided upon measurement setup between the license provider and the entity owner. Within the method these two approaches on category weight are called pre-set category weight and derived category weight.

Position Weight:

Upon measurement interviews will be performed with people who have different types of responsibility. To limit variations, that may be due to the fact that the actual sample do not reflect the organisation structure of the Entity, the Position Weight is used. Like in the previous weights a 5-graded scale is used, where 1 represents a low position weight and 5 represent a high position weight. All position weights are explained below:

1. A person with no responsibility for information security issues. This person does not participate in any issues regarding information security. Typically ordinary users of IT systems will constitute this.
2. A person with minor responsibilities within information security areas. This person may participate in some kind of forum regarding information security issues. Typically persons that have some kind of responsibility regarding IT systems, facilities or organisation structure will get this position weight.
3. Person responsibilities within information security areas. This person have this responsibility as his or hers daily routine. Persons, which get this position weight often, have their responsibilities towards an IT function within the entity. All personnel from the measuring organisation will have a position weight of 3.
4. A person, which have major responsibilities within information security areas. Persons, which get this weight, may be on executive level within the entity, or they may have some overall responsibility for IT function or specific information security areas or issues.
5. A person, which have the highest responsibility for issues regarding information security. Typically this person is on executive level.

The position weight is used in the method to grade answers, inspection or analysis. It's vital that all the position weights together don't give a false or weighted result. For example, a person having a high position weight will have higher impact on the checkpoint result than a person with a low position weight.

The license provider adds a restriction on position weights of the entity saying: There must always be enough lower position weights to cover a higher position weight. For example this means that if there is one person participating who has a position weight of 4, there must be at least 4 people with position weight of 1 to cover.

The example described above gives the notion that this may not always be true. There may not be enough persons to cover a higher position weight. Therefore, the method uses fictitious persons to cover. These fictitious persons are based on a mean value of the results from the other persons within the same position weight.

Time Effort Weight:

Each checkpoint has some drawback if the measurement gives a result that is below the norm, 3. To be able to measure the effort in time that the entity has to provide to correct (i.e. pass) the checkpoint from a very low state, the time effort weight is introduced into the method. The time effort weight uses a scale form 0 to 5 where a low time effort weight represent that the entity has to put aside a minimum of time to solve the problem. A high time effort weight represent that the entity has to put aside a considerably amount of time to solve the problem. The complete scale of time effort weight is presented below.

0. No time must be put aside to solve the problem. This is actually a special case and will not be used often because to correct a potential problem the entity must put time aside.
1. A small amount of time must be put aside to solve the problem. Typically a time effort weight of 1 represents a work time amount of minutes. Usually the effort can be solved within the entity.
2. A minor amount of time must be put aside to solve the problem. Typically a time effort weight of 2 represents a work time amount of hours. Usually the effort can be solved within the entity.
3. A medium about of time must be put aside to solve the problem. Typically a time effort weight of 3 represents a work time amount of days up to one week. Usually the effort can be solved within the entity. Additional help from outside the entity may be required.
4. A considerable about of time must be put aside to solve the problem. Typically a time effort weight of 4 represents a work time amount of weeks or up to one month. Usually the effort cannot be solved within the entity. Additional help from outside the entity is required.
5. A substantial about of time must be put aside to solve the problem. Typically a time effort weight of 5 represents a work time amount of months or years. Additional help from outside the entity is always required.

Cost Effort Weight:

To be able to measure the effort in costs that the entity has to provide to correct (i.e. pass) the checkpoint from a very low state, the cost effort weight is introduced into the method. The cost effort weight uses a scale form 0 to 5 where a low cost effort weight represent that the entity has to put aside a minimum of funds to solve the problem. A high cost effort weight represent that the entity has to put aside a considerably amount of funds to solve the problem. The complete scale of time effort weight is presented below.

0. No amount of funds must be put aside to solve the problem.
1. A small amount of funds must be put aside to solve the problem. Typically a cost effort weight of 1 represents funds below $100.
2. A minor amount of funds must be put aside to solve the problem. Typically a cost effort weight of 2 represents funds below $1000.
3. A medium about of funds must be put aside to solve the problem. Typically a cost effort weight of 3 represent funds below $10000
4. A considerable about of funds must be put aside to solve the problem. Typically a cost effort weight of 4 represents funds below $100000.
5. A substantial about of funds must be put aside to solve the problem. Typically a cost effort weight of 5 represent funds over $100000.

Effort Weight:

The time effort weight and the cost effort weight form the actual effort weight for a particular checkpoint. This is done by adding the participating types of effort weights to each other and then by dividing with the number of effort weights. By stating this last condition the effort weight may include further effort factors in later versions.

Entity Template:

Together the effort weight, threat, probability and consequence form several factors between 1 to 5 for each measured checkpoint. All the factors for each checkpoint form a matrix called the entity template. The entity template forms the basics for importance and the different effort between checkpoints.

The license provider form the basic entity template for each measured level. Upon measurement setup the entity owner has the right to adjust the basic entity template to meet the measured entity's needs or structure. The license provider has set a constriction on modifications on the template, which include that no factor may increase more than one and no factor may decrease more than one.

If an entity will choose to alter the basic entity template, the altered version will be used in all the sub entities within the measured organisation.

The license provider also has the possibility to alter the entity template to meet certain conditions stated for different types of entities. There may be an entity template for health care and another for process industry, for example.

In order to have an open comparison independent of variations of the actual entity should generally an altered entity template not be considered and the basic entity template should be used.

Definition of Checkpoint Grades

Each checkpoint that is measured is given a grade. The grade is set upon a specific checkpoint during interviews, inspections, system analysis or documentation analysis. The grade is constructed with a six graded scale, where 0 is the lowest grade and 5 the highest. Like in the method level norm, a norm grade is used on a specific checkpoint. This norm is also set to 3. A grade lower than 3 represent a checkpoint that is not passed, and likewise a grade higher than or equal to 3 represent a passed checkpoint. All present checkpoint grades and their meaning are stated below. The meaning of the actual grade is different depending upon the information security area measured.

| | |
|---|---|
| Grade 0 (Failed) | There are severe/crucial shortages or lack of information resources concerning: Knowledge Documents or document content System implementations or configurations Facilities, facility construction or Implementations |
| Grade 1 (Failed) | There are major shortages of Information resources concerning: Knowledge Documents or document content System Implementations or configurations Facilities, facility construction or Implementations |
| Grade 2 (Failed) | There are minor shortages of Information resources concerning: Knowledge Documents or document content System Implementations or configurations Facilities, facility construction or Implementations |
| Grade 3 (Passed) | There are no shortages of Information resources concerning: Knowledge Documents or document content System Implementations or configurations Facilities, facility construction or Implementations |
| Grade 4 (Passed) | There are no shortages of Information resources concerning: (and checkpoints passed with commendation): Knowledge Documents or document content System implementations or configurations Facilities, facility construction or Implementations |
| Grade 5 (Passed) | There are no shortages of Information resources concerning (and checkpoints passed with high commendation): Knowledge Documents or document content System implementations or configurations Facilities, facility construction or implementations |

The grades can also be seen as an analogue scale using natural numbers adapted to each information security area as follows:

- Logical Information Security,

0———————————3———————————5
Don't know/lack of doc.   Passed        Passed with high
content document                        commendation
content

- Physical Information Security.

0———————————3———————————5
Lack of resources or     Passed        Passed with high
Implementations                         commendation

- System Information Security

0———————————3———————————5
Lack of Implementations  Passed        Passed with high
or configurations                       commendation The definitions on how each grade is set upon a specific checkpoint will be discussed later in this document.

Definition of Checkpoint Demands

The approach of grading is achieved by stating a specific demand on each checkpoint. The demand may vary from a specific text that must exist within the controlled entity's security policy or that a specific type of door must be used in the computer room. Within the system security area for example, must the e-mail service be configured in a way that will minimise a security breach. All these conditions form together the method demands. As stated earlier the demands will vary from each information security level. All checkpoint demands are derived from the information set.

Definition of Result Grades 1 to 5

If the demand on a specific checkpoint is fulfilled, a checkpoint grade of at least 3 will be given. To give a checkpoint a grade of 3 is actually not a major problem because the demand is derived from the information set, which it's based upon standards like BS7799, SS3492 etc. To give a grade of 0 is not either a difficult task, because this grade states a total lack of information or protection. The tricky part is to grade a checkpoint either lower (1 or 2) or higher (4 or 5) than 3.

This latter part is up to the rating reviewer. It's his or hers responsibility to give a correct grade on the checkpoint. The actual grade properties have been stated earlier and those statements form the basics within the method to give a correct grade. To pass a certain checkpoint the demands must be completely fulfilled. On each demand there is also a negative and a positive aspect defined and described. These aspects will act as a grading guide on each checkpoint and help the reviewer towards giving a correct grade during the analysis.

The positive and negative aspects are stated in a generalised form. For example a checkpoint about fire protection in the computer room will at rating level of 3 have the demand stating that a fire extinguisher of the proper type should be placed easily accessible and signs have to be in place. A typical positive aspect on this checkpoint will be if the extinguisher is placed in an excellent position, it has been controlled recently and there are signs which are both obvious and of a excellent quality. A typical negative aspect will be if the extinguisher is not of the proper type (extinguish electrical fires), it's not obvious where to find it and signs may be misplaced. The amount of positive and negative aspects on a specific checkpoint will guide the reviewer to the correct grade.

But there is a potential risk that one checkpoint may be given different grades depending on who the rating reviewer is.

To meet this potential risk the method states that each checkpoint, where there are doubts must be controlled within the rating reviewed team. The method states that all checkpoints, even if there is only the slightest of doubts upon the grade, should always be reviewed by the rating reviewers team. It's then up to the team to set the final grade. By adopting this technique within the method, there is only a minor chance of faulty grades.

When all grades have been set for all three information security areas, the basis for calculating the final results are in place.

Method Development and Versions

Norm Level Development

To put all the demands and set of fulfillments into the method, the license provider determines the set of criteria forming the norm. This is done by analysis of the various sources mentioned in the previous chapter 2.2. All the analysis is performed by identifying the common parts between each information resource. The common parts are stated as the backbone for the norm level, Veriscan 3. This is done on each information security area: Logical, Physical and System.

The backbone information resource is evaluated against current market information security demands, fulfillments and actual market situation. The information set produced after evaluation form the full set of information used in the norm level, Veriscan 3.

On the full set of information the license provider, performs various tasks to group, divide and adopt the information set into the method. This step creates the areas, categories and checkpoints of the norm as described in chapter 2.2.

As time goes by new features and factors will change the global information security market. New technologies will be adopted and many security issues will be both changed and revised. For example, there will be new inventions to meet threats from hackers and crackers and the method must have a built in support to deal with these kind of situations. This means that the checkpoints, weights, demands and so on will have to change over time.

To meet the ever changing information security market the method uses a version numbering. The method version numbering uses three number stated as a.b.c. The a represents a major version/revision, the b represent the market version and the c stands for the internal working revision number. Analysis towards an entity can only be performed on a market version.

The method states that a new major version can only be released if all information security areas are revised onto the corresponding major version, i.e. 1.b, 2.b, 3.b etc. This means if some area is to be revised onto a new major version the other areas must also be revised.

The market versions are the actual versions which are used to perform analysis and measurements. These versions do not have to be at the corresponding level at each information security area. For example, it's possible to use a different market version on the physical area and another market version on the system security area. Internal working revision numbers are only used by the license provider, these revisions are never used in actual analysis or measurements.

When a new major development, a new security technique has been adopted or a major shift in social behaviour within the information security areas, the market version have to shift. This is a trigger in the method to develop a new major version. When to develop new market versions, is mainly controlled by involving new standards, guidelines or other information security information sets. A new market version must also be developed if transferring a certain security feature from a higher rating level to a lower. The whole process of developing new versions and revisions is up to the license providers ability to cover the information security market and to be up to date with the day to day information security situation.

Measurement Basic Methods

In the following is described the main tasks during the actual measurement performed towards the entity. This is a principle overview. Detailed information about what and who is set in method software program depending on the level selected.

Document Analysis

Document analysis are performed by the rating reviewer team. The reviewer uses material produced by the license provider to perform the analysis. To analyse the documentation the reviewer uses the statements within the method. Demands on context and text are derived from the information set used at the measured level, i.e. rating 1 to 5. Document analysis are performed within each information security area. The grades set upon the analysis are derived from the following:

Are the appropriate (set by the method) documentation supplied by the entity

Does the context of the documentation comply with level demands

Does the text within the documentation comply within the level demands

Interviews

All interviews are performed by the rating reviewer team. This is done by asking the respondent the set of questions applicable for his or hers position weight. The material used is applicable for the measured level. Interviews can be performed by a sole reviewer team member. Interviews are performed within each information security area. The grades upon interviews is always set according to:

The respondents ability to answer in general

The respondents knowledge about the checkpoint measured.

Inspections

All inspections are performed by the rating reviewer team. Inspections mainly concern facilities in the context of information security. A checklist is used for the measured level. Inspections can be performed by a sole reviewer team member. Inspections are only performed within the physical information security area. The grades upon inspections are set upon:

Are the protections applied

The protections quality

IT-System Analysis

The IT-System analysis is performed using a software toolbox according to the actual situation of Entity IT-systems. Different modules are used in the toolbox depending on what systems are in use and also the level chosen.

Differences of Methods Depending on Level

There is also a difference to the extension of the measurements depending on which rating level that is measured. This can be seen in table 2a.

The extension of method used during the measurement is determined by which rating level that is used. Interviews will be used more extensively and they will be more comprehensive the higher the measurement level is. Documentation analysis will also be conducted more thoroughly the higher the measurement level is. Inspections will also follow this pattern. System analysis will be performed in somewhat other manner. The higher the measurement level, the amount of system checks will be extended.

Generating Method Results

To generate the actual results from the checkpoint grades the method states that several mathematical calculations will be performed. These calculations will use all the prior discussed methodology and factor like weights and templates. All different types of calculated results will be covered in this chapter.

Result Definitions and Abbreviations

Grades

CpG=Checkpoint Grade

CpWG=Checkpoint Weighted Grade

Weights

CpW=Checkpoint Weight

CaW=Category Weight

EfW=Effort Weight

Primary Results

CpR=Checkpoint Result

CpWR=Checkpoint Weighted Result

ArWR=Area Weighted Result

Secondary Results

CaR=Category Result

CaWR=Category Weighted Result

ArR=Area Result

ToR=Total Result

ToWR=Total Weighted Result

Gaps

SeG=Security Gap

PrG=Priority Gap

The Result Generating Principle

The primary results are the results used for evaluation for level fulfilment and the basis for official statement. The primary results are the CpR and the CpWR and ArWR. All other results are secondary results and are used as guides or key values in the evaluation of the results.

The primary result generating formula takes each CpR to the weighted CpWr by using the weights and transforms this to the ArWR. The level fulfillment is then based upon that ArWR is passed for all three areas; Logical, Physical and System.

Generating Method Results

The Non Weighted Checkpoint Result (Primary)

The non weighted checkpoint result (CpR) is the raw result set by the reviewer team. There are no weights used on this result and therefore the value of the result has no properties connecting it to the entity template or to the actual respondent type. This result represent if all checkpoints where equally important and if all respondents has the same information security responsibility.

The Weighted Checkpoint Result (Primary)

This result is calculated by consider different factors defined previously to affect the importance of the checkpoint. The checkpoint results are calculated based on the entity template. The weighted checkpoint result (CpWR) is the basis for the calculation of the total performance of the analysis and subsequently the results which the rating is based upon.

The Category Results (Secondary)

Category results are contraction of the results of the checkpoints that are within that category and represents a mean value. The result of a category is merely a result to seen stand alone as it is not a calculated part of the total result. The category results can be of two types:

Non Weighted Category Results (Secondary)

The raw (unweighted) category result (CaR) is generated by mean value of the non weighted Checkpoint result (CpR). These results has no correspondence to the entity template or respondent types.

Weighted Category Results (Secondary)

The weighted category result (CaWR) is based on the mean value of the weighted checkpoint results (CpWR). Thus the CpWR follows the entity template and the actual types of the respondents.

The Area Results

The area result is a contraction of the checkpoint belonging to an area and represents a mean value. An area result is a stand alone result and can be of two types.

The Non Weighted Area Result (Secondary)

The raw (unweighted) area result (ArR) is generated by all non weighted results of the checkpoints belonging to the area in question and are a mean value. These results has no correspondence to the entity template or respondents types.

The Weighted Area Result (Primary)

The weighted area result is generated by all weighted results of the checkpoints belonging to the area in question and are a mean value.

The weighted Area result (ArWR) is based on the weighted calculated results and are by that based on the entity template and the actual types of the respondents.

The Level Fulfillment (Primary)

The total result is if each of the three areas have passed a value of three. The total result is presented as "Passed" or "Failed" the rating on the actual level depending on that all areas shall have performed with grade three or higher on each the weighted area result (ArWR). To have passed no checkpoints with a high checkpoint weight shall have a result that is less than 1.

Additional information can be obtained by looking at a total result generated by the total mean values of all the checkpoint results. These additional total results can be of two types:

Non Weighted Total Result (Secondary)

Also here a raw (non weighted) total result (ToR) can be calculated based on all non weighted checkpoint results. These results has no correspondence to the entity template or the respondents types.

Weighted Total Result (Secondary)

The weighted total result (ToWR) is also calculated based on all weighted checkpoint results. This result is based upon the entity template. These results are corresponding to the entity template and the respondents types.

Gaps

The gaps are results that are distances between values set in the method and results generated by the analysis. Definitions of gaps can also be seen in FIG. 4b.

Security Gap

The security gap (SeG) is calculated for each checkpoint by comparing the checkpoint result to the norm value of three that equals the result needed to pass the demands on the checkpoint. The checkpoint result is subtracted by 3 and if the result is negative is there a security gap equal to that figure.

Priority Gap

The priority gap (PrG) is calculated by taking all checkpoint results that have a security gap and adding the security gap for the checkpoint and the difference between the actual effort weight for the checkpoint and the maximum value of five.

Method Processing

In the following will be described how to work with and implement the method. The method processing is how the results are gathered. As the method is software supported by a method software program, this is also described under this heading as well as the software toolbox for system security testing.

General Work Flow

The measurement follows a number of process steps/phases as can generally be seen in FIG. 3.a. This can also be described more in depth by a phase description. It is important to again point out that as the basis for the result is the actual performance that the Entity shows for each checkpoint, and the major part of the work is carried through by gathering and determine the performance of each checkpoint included in template.

Phase 1—Pre Study, Setting the Level Template

This phase is to determine what actual level that is preferred by the Client and requirements that the client may have. It is also to determine minor adjustments of the method, such as terminology. Further it will state what kind of documentation that is expected from the client as well as how organisation and system layout will set the parameters for interviews and system check modules. A list of Actions will be set for the Entity to fulfil.

Phase 2—Set Up of the Method Software Program

The Reviewer receives the method software program and the software toolbox. The method software program will be set with parameters for basic terminology of the Entity and data for interviews as well as system check modules.

Phase 3—Documentation Analysis

The Reviewer following the guide in the software program sets the actual measurement and results on the Checkpoints considering documentation and the results (0-5) for each Checkpoint are put in.

Phase 4—Interview Analysis

The Reviewer performs the interviews of different personnel within the entity and the results (0-5) for each Checkpoint are put into the software program.

Phase 5—Physical Inspections

Physical inspections are conducted at the premises of the Entity and results (0-5) for each Checkpoint are put into the software program.

Phase 6—System Analysis

The modules for systems tests in the software toolbox are conducted and the results (0-5) for each Checkpoint are set in the method software program.

Phase 7—Result Calculation

The result file is sent to license provider for calculation of the results according to the set up determined in the pre study phase.

Phase 8—Result

The final result is sent to the Reviewer in electronic format.

Phase 9—Report

The reviewer chooses standard report that will suit the Client directly from the software program.

Phase 10—Presentation

The reviewer will present the results to the Client. The client will also get the electronic copy.

Phase 11—Analysing the Result

The Client may reconstruct the result in a fashion that suits him and can from the electronic copy sort the result in many different ways to be able to set priorities for enhanced information security.

The process above and in FIG. 3.b is simplified somewhat and does not cover how the methods differs between different levels and/or areas.

Phase 12—Renewal of Verification

The process is a single loop process but as time will affect the security level should a renewal of the verification be necessary in order to keep the verified level, see the last step. If so the first step "Pre-study" can be much more limited and only cover differences. However if the renewal of the verification is done on a higher level a full pre-study must be carried through.

Method Software Program

The software program supports the method and contains necessary data to perform the measurement. It also serves as the basis for how to handle data between License Provider and Reviewer. The method software program generally support all phases described above.

Data Handling Between Reviewer and Licence Provider

The License Provider will send the method software program to an approved Reviewer when a Client has been contacted. The Reviewer will receive the first part contain all necessary software to be able to carry out the Pre-Study phase.

When the Pre-study Phase is done a file will be sent by the Reviewer to the Licence Provider generating the set up for the Client.

The method software program for the specific client will be sent to the Reviewer, that will put in all the results gathered and when finished a file will be sent to the Licence provider. The file will be the base for calculating the final result and these will than be sent to the Reviewer to present this to Client as the last pieces in the method software program.

It is important to point out that the License Provider will always have the mathematical criteria's for determine the final result and thus ensure that the result is done correctly.

Method Support

The method software program will contain all questions and guides of how to perform the data gathering and setting the raw results. It will also contain features that will speed up the process of gathering the data.

The method support software program contains also the values for effort weights for each checkpoint.

Result Presentation and Analysing the Result

The method software program will generate a number of standard reports to choose from. This will include both written and graphical presentations.

The report will be in a form of a database and also enable the Client and/or Entity to revise the result in a way that suits further work and actions to improve the information security.

Software Toolbox—IT-System Security Analysis

The idea with using a software toolbox is that IT-systems are somewhat insecure because the rapid development of hacker and cracker tools on the Internet.

The software toolbox contains a major part of hacker and cracker tools and other system analysis tools and it will enable modifications to adapt to be used for the actual analysis. The toolbox is built in a modular system to be adaptive to actual system. Here the variation could vary greatly when it comes to applications. In order to handle that situation are the applications dived into standard application and extended application. The standard applications are the ones that are known and which information about threats etc is available to anybody. Extended application could be unique, new or old application where information is not available. These have to be dealt with depending on what functions they may have. If they are considered to be of importance from a security point of view they will be tested and moved to as a standard application for the next test.

Method Result Presentation

In the following will be described how to interpret the results. The results are presented in two media. One media is written report and the other media is a software. The results are presented as text and also in graphical format.

Presentation of the Total Result

The presentation of the total result is presented in written form as "Passed" or "Failed" on the level measured. If passed the Entity Owner will receive an Certificate stating that the Entity measured has for example passed the Veriscan 3 (Or applicable level). Additional comments on major issues are addressed. As the total results is based on the results of each area is the total result also presented in a graphical form including the three areas, see FIG. 4a.

Presentation of Category Results

The category results are presented in a graphical format showing the weighted and non weighted results for each category within an area for all three areas. Written major comments are added.

Presentation of Checkpoint Results

For each area and under each category are the checkpoint results listed as verbal comments and connected to these are also the graphical presentation. For each checkpoint result is also the effort weight presented, see FIG. 4b.

In the graphical presentation can also the Security Gap (SeG) clearly be seen and also the Priority Gap (PrG).

Evaluation of Results

In the following will described how to interpret the various results and how to use them separately and to use them together.

General Principle

The methodology is based on the principle of that the total security level is depending on that the three sub areas has an equally sufficient security level. Within each area is then the result generated by mathematical formulas adding up the results from each checkpoint within the area. For each category is also the results mathematically calculated from the results from each checkpoint as well as there is also a total result generated by calculating all checkpoints but this is additional information.

Thus is can be stated that the method's results are gained from measuring the smallest part, the checkpoint, and summarise these into the areas. If all areas have passed a critical value is the level approved and the organisation has passed the test on the decided and measured level and can be given its certificate/Rating for that level.

As all results are numerical from total rating to area, category and checkpoint they are comparable within the level. As they are in numerical form they are possible to compare between different analysis conducted, if consideration are taken into versions and that comparison is made on the same type of value (weighted or non weighted).

Evaluate the Result on the Total Level

The result of the level measured requires that all three areas has a result of three or higher to be approved on the level. If approved the entity will be rated according to the level measured, Veriscan 1 to 5.

As the lower level are a sub set of the above level it may be possible to receive a lower rating than on the actual level measured, e.g. if not approved on measured level Veriscan 3 but approved on level 2 the organisation will be rated 2. But it is not possible to have a higher rating than the level that was measured due to that higher levels contains more extended demands and more checkpoints, e.g. if measured on level three and approved with a high margin it is still not possible to receive a higher Rating than Veriscan 3.

If a result of less that 1 is achieved on particular important checkpoints this will be stated. This may be a checkpoint necessary to have a passed result.

Taking the Secondary Total Analysis results both in weighted and non weighted form will indicate the following:

If a ToWR is higher than or in the region of 3 but the analysis is not passed, there is minor achievement needed to pass on the level and subsequently if the ToWR is lower there is major amendments necessary.

If the ToR is higher than the ToWR this shows that the entity is not good at important checkpoints. If the ToR is lower than ToWR is the organisation generally performs better on important checkpoints. This information is suitable for top management presentation and comments.

Evaluate the Result of an Area

The result of each area is on an analogue scale of 0-5, and that the result of 3 or higher for each area means that the area has been approved according to the criteria set for the level. As the method is based upon that the security demands on each area are balanced within a level, it can easily be evaluated which are needs attention if a non-approved result is achieved.

Further more the results of each area can easily be distributed to responsible managers within the entity is so preferred by the client.

For example:

| | |
|---|---|
| Logical Security | Result: 2,3 |
| Physical Security | Result: 3,6 |
| System Security | Result: 2,9 |

The conclusion is that the Management has to look into the Logical Security Area, as the most action needs to be taken there. The System Security Area needs just some minor action to pass and the Physical Area does not need any further investments at the moment.

Within an Area the results on each checkpoint could also be evaluated. However this should be done in two different ways. First the comparison between if the performance have been generally good or poor on important checkpoints. This should be done by comparing the non weighted and weighted results on the Checkpoints of the Area, e.g. comparing Area Result without Category weight (AeR) and Area result with checkpoint weight (AeRW).

If the weighted Area result (AeWR) is lower than the non weighted area result (AeWR), the entity has mainly poor results on particular checkpoints that are more important than others, i.e. have a higher checkpoint weight. If the (AeWR), is higher than the (AeR), the organisation has reached good results in checkpoints that are generally more important then others. The second evaluation is of course to see what checkpoints that have a non-approved result and also to see what is the performance on the most important ones.

Evaluate the Result of a Category

The results of a Category is also on a analogue scale of 0-5, and that the result of 3 or higher for each area means that the area has been approved according to the criteria set for the level.

A result of X means that the specific Category has not been measured.

Evaluation should be made taking the results of categories within an area and compare weighted and non weighted results. This is additional information and could serve as a guide for management on a not to detailed level.

This is done by comparing the weighted result (CaWR) and compare it to the non weighted result of the same category (CaR). If the weighted result (CaWR) is higher than the non weighted one (CaR) is the organisation better on important categories.

Particular attention should be taken to Categories not measured.

Evaluate the Result of a Checkpoint

The results of a checkpoint is also on a analogue scale of 0-5, and that the result of 3 or higher for each area means that the area has been approved according to the criteria set for the level.

A result of X means that the specific Checkpoint has not been measured.

As the Checkpoint results are the basis both for the results but also for the actions can the evaluation of this bee done in many ways. When evaluating the Checkpoint is it also possible to use the Effort weights and also the Position weights to get more information of taking the proper actions for enhanced information security. However these results may not bee necessary to view for top management but can be used for the personnel directly responsible within the Entity for certain information security areas and categories.

The first evaluation should be done so that the security gap is considered, meaning that checkpoints with a low result should be looked into. These should then be divided into different groups. The first group is the ones with low Effort weight, which means that actions can be taken directly to correct them.

Secondly are the ones with higher effort weights where work should be initiated and evaluation of proper actions should start. Third is the group that has medium effort weights, which should be looked into individually.

Naturally the checkpoint results could be sorted within Areas and/or Categories if so preferred.

It is also important to point out that as the effort weights are general there are variations depending on the Entity resources. For example if the entity has a large IT department the costs may be lower to make correction as less eternal purchase of Consultants may be necessary.

Further Position weights could be analysed to evaluate where necessary training of information security is needed, e.g. if generally personnel with high weight have poor results but not personnel with lower, management and IT personnel needs more training than the standard users.

Particular attention should be taken to checkpoints not measured.

BRIEF DESCRIPTION OF THE FIGURES

FIG. 1a

Shows entities with described needed measured information security level. Two entities shares or exchange information that is considered valuable. The entity to the left has a certificate on Veriscan level 3 but does not know what information security level the right Entity has. Insecurity arises and the transaction may not take place. If however the right entity also had a corporate certificate on a Veriscan level suitable to them, the left entity can evaluate if they can handle the information properly. The corporate certificate has enable trust and the transaction may take place. Comparison between entities has been enabled when it comes to such a complex area as information security by simply stating a figure created related to a norm.

FIG. 2a

Figure 1A:
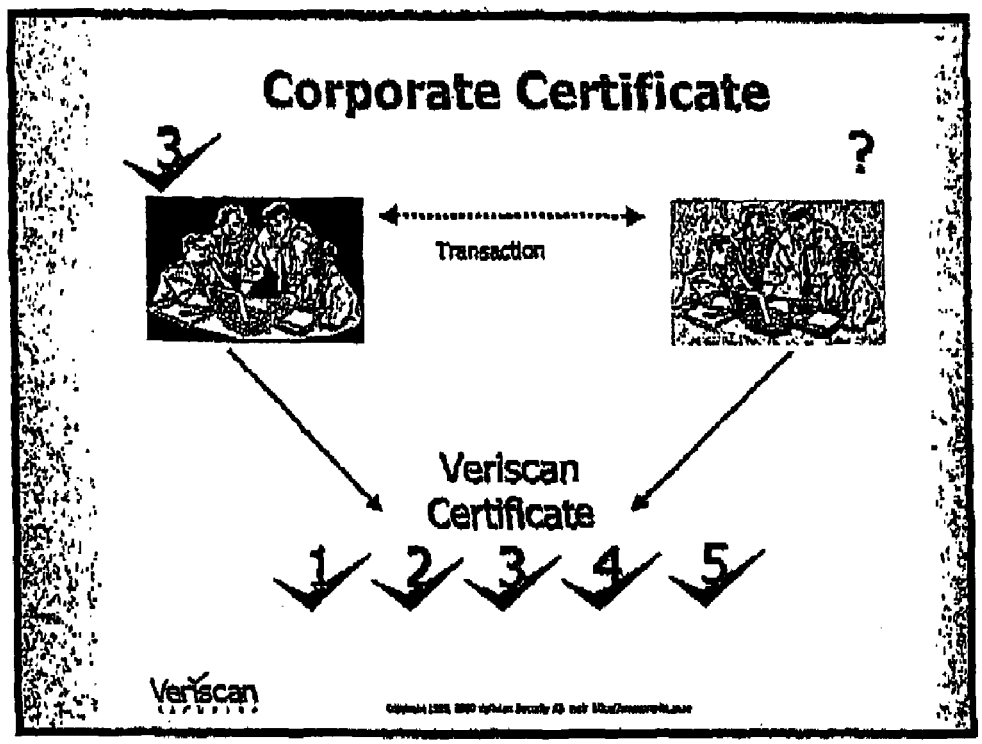
Figure 2A:
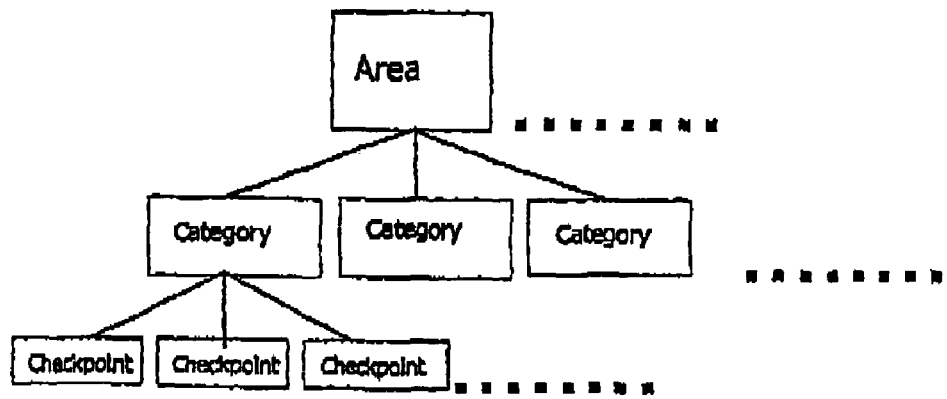
Figure 3A:
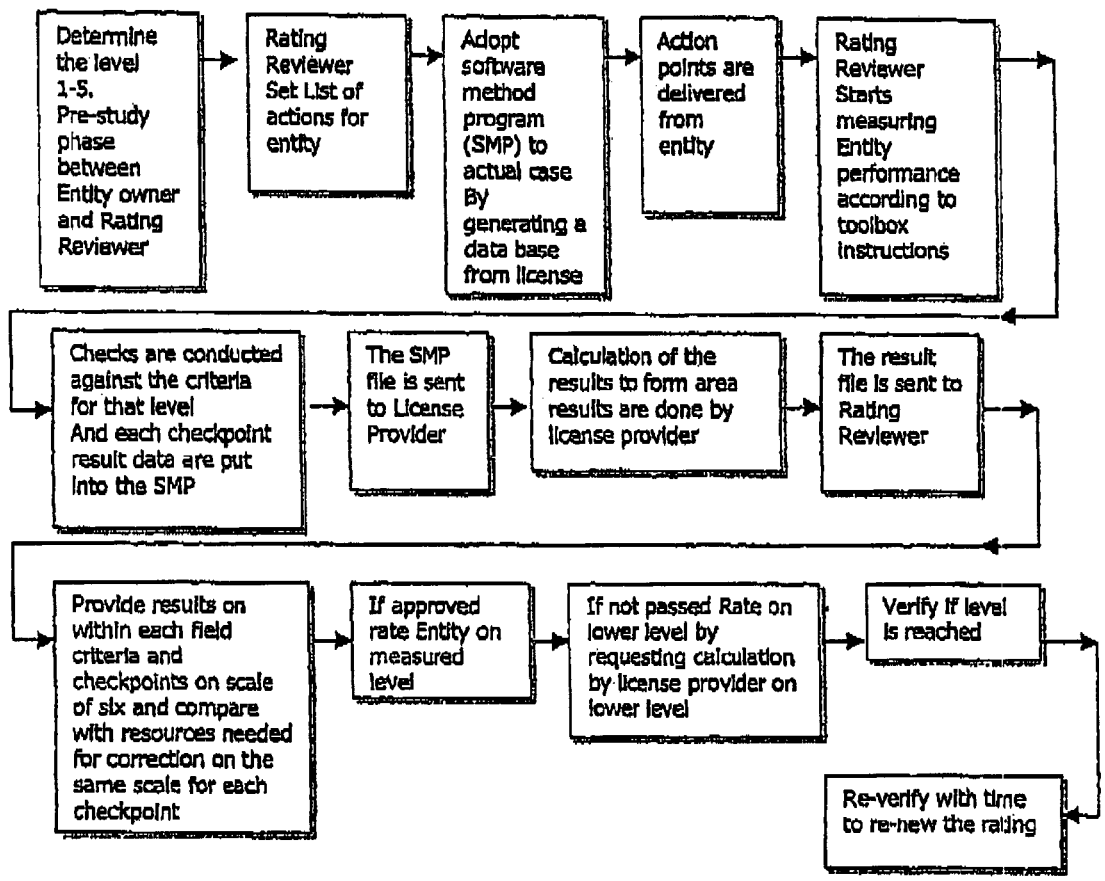

FIG. 2a shows the principle of the breakdown of terms within an area.

Table 2b

Table 2b shows the method differences between the levels.

FIG. 3a

This figure shows the method steps.

FIG. 4a

FIG. 4a shows the total results in graphical form.

FIG. 4b

Figure 4B:
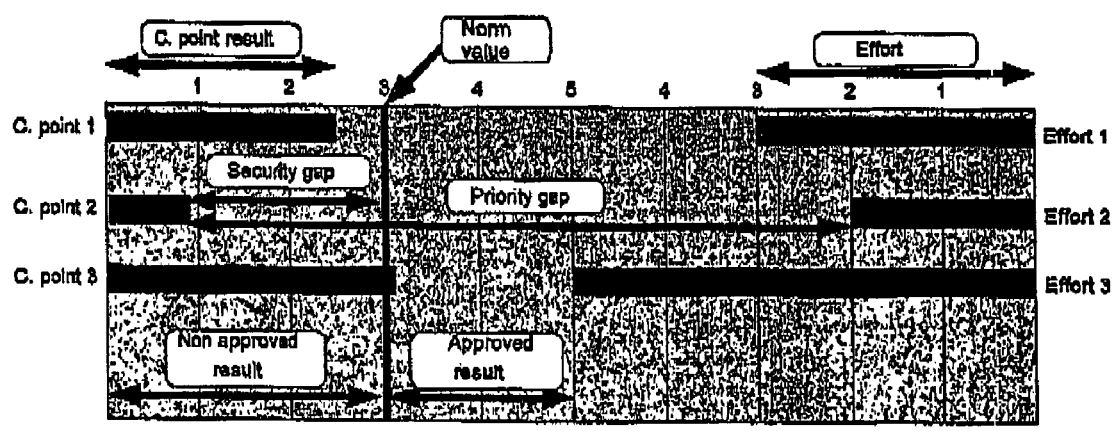

FIG. 4b shows a graphical result table

FIG. 5

Figure 5:
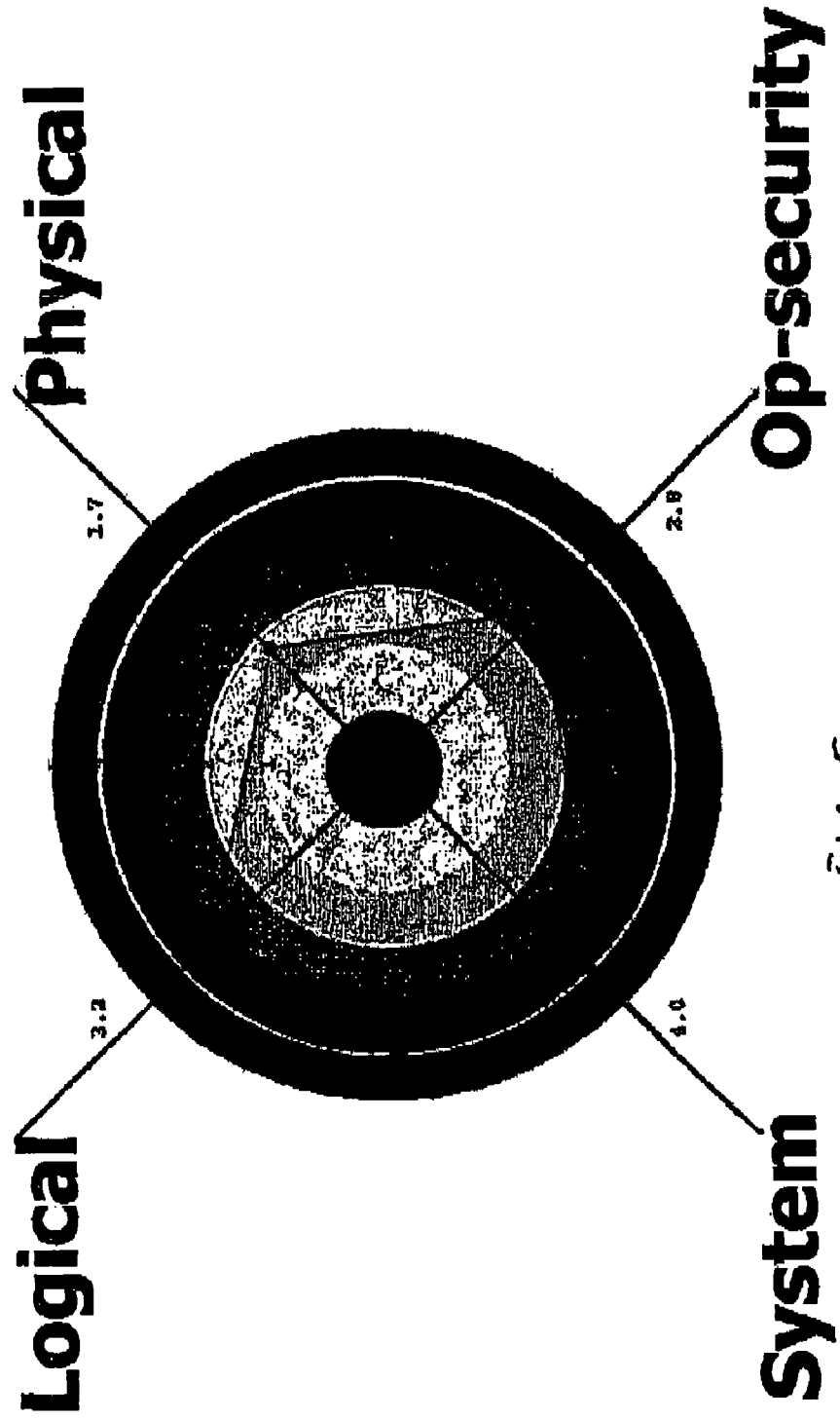
Figure 1:
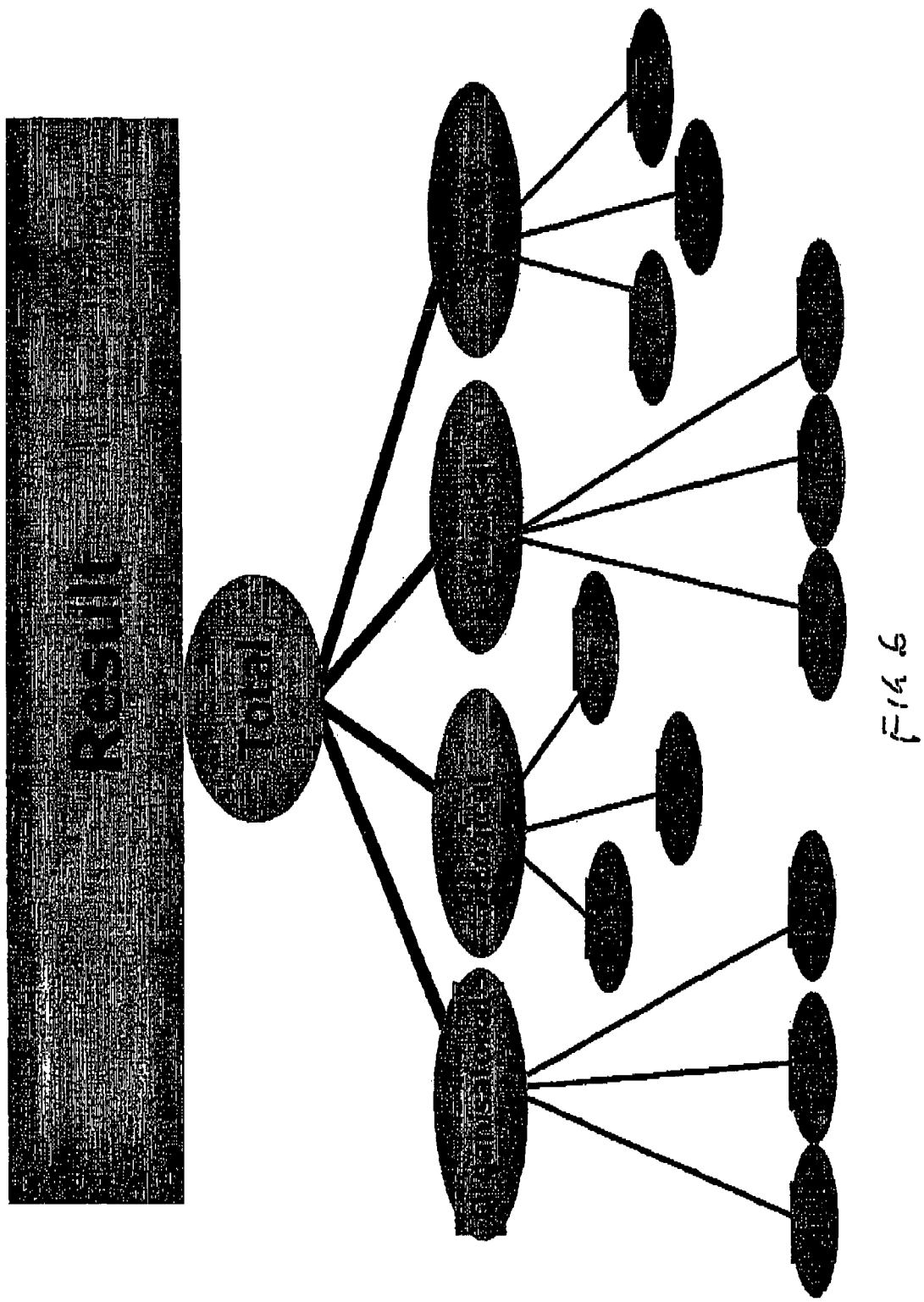

FIG. 5 is a schematic diagram showing an exemplary result of Veriscan Rating 3, including ratings for logical, physical, system, and operational security.

FIG. 6

FIG. 6 is a schematic diagram showing an exemplary hierarchy of a total result, including a total based on organizational, logical, physical, and system checkpoints.

A COMPLEMENTARY WAY OF DESCRIBING THE CONCEPT

The concept is described in a complementary way by means of 65 slides of a slide show enclosed on separate pages numbered 1-33.

The method according to the invention could also be extended to operational risk rating.

Operational Risk is here defined as an organisation total risk of loosing immaterial assets.

As information is a major part of immaterial assets is it possible to add a fourth area to the three areas for information security to control and rate also Operational Risk. This Fourth area is subsequently only added if Operational Risk Rating is selected rather than Information Security Rating.

This is called Veriscan Rating of Operational Security.

Definition Organisational Security

Operational risks is defined as other risks of errors, mistakes crime or accidents that causes directly or indirectly losses.

Organisational Security risks are defined as risks as above caused by the organisations structure and functions and environment. Environment could be linked both to factors that the organisation controls as well as the environment in which the organisation operates that is outside of the organisation's control.

TERMINOLOGY AND METHOD DEFINITIONS

The method is the same as for measuring Information Security.

The categories and checkpoints are of course of a different type. Categories are such as: Legal, Image and PR, Control Systems, Business Strategies, Authorities, Financial, Market Mix, Spirit, Product & Service Structure.

Measurement of Organisational Risk

The measurement is basically the same as for the other areas and only abbreviations will be presented in these chapter.

Measurement Basic Methods

The measurement are using the same methods as for the another three areas with one slightly different aspect and that is that the measurement of IT/Systems is naturally not used.

For measuring Financial Risk, may also sector or other methods be used, as these are from the beginning in mathematical form that can be transferred to the relative system in this method.

Area Results

The area result is presented separately, and also in a graphical form including the other three areas.

Level Fulfilment

To add organizational Risk to the other three areas states that the measurement of fulfillment is done for Operational Security and not for information security. But as information security is part of the Operational Security must all areas have been measured and have passed result to be rated for Operational Security. This is the identical principal as Informational Security Rating but there are four areas to consider.

Method Processing

The method processing for Operational Risk Measurement is done in addition to the information security measurement and follows it's workflow. Only differences will be stated in this chapter.

The major difference is that from start it must be clear if it is the information security that should be measured with Logical, Physical and System areas or operational Security which ads the fourth area Organisational Risk.

The workflow is in principle the same with the exception of that System analyses is not conducted.

There will be additions to all other phases to cover the forth area. Generally the fourth area means that each phase is spitted up with two focuses. One is the same to cover Information Security and the second focus is the Organisation Security measurement. The pre-study for example will be extended as a much more documentation and more people have to interview and this must be set from start.

Method Result Presentation

The result is presented in the same manor but with the addition of the fourth area. Please see below. The symbol for passed rating for Operational Security is different as for information security Rating and the name are also different in order to not misjudge the different measurements.

Concept

- Why a Security Concept?
  - Create added value
  - Fulfil a need
  - No standard is complete
  - Organisations want to breach the complete picture
  - There is a need for quick answers and actions
  - A base for comparison must be created
  - Customer A do not have the same need as B
  - IT-security is constantly changing

Why a unique concept ?

- The Veriscan Security Concept measures Security !

- Difficult: Yes. But other complex areas can be measured so why not security?

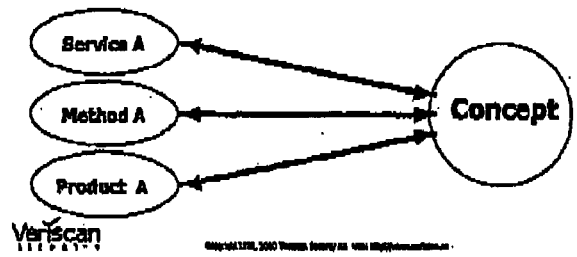
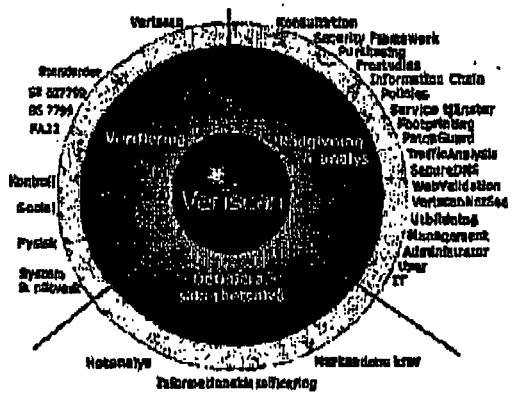

Backgrounds information

Everything is there and the creation is the way we use it!

- International standards
- Legislations
- National standards
- Internet standards
- Corporate standards
- Military standards
- Standards for Public sectors
- Educational standards
- Etc...

Veriscan

Background info Cont.

Knowledge → 
Standards → 
Literature →  Veriscan

Veriscan

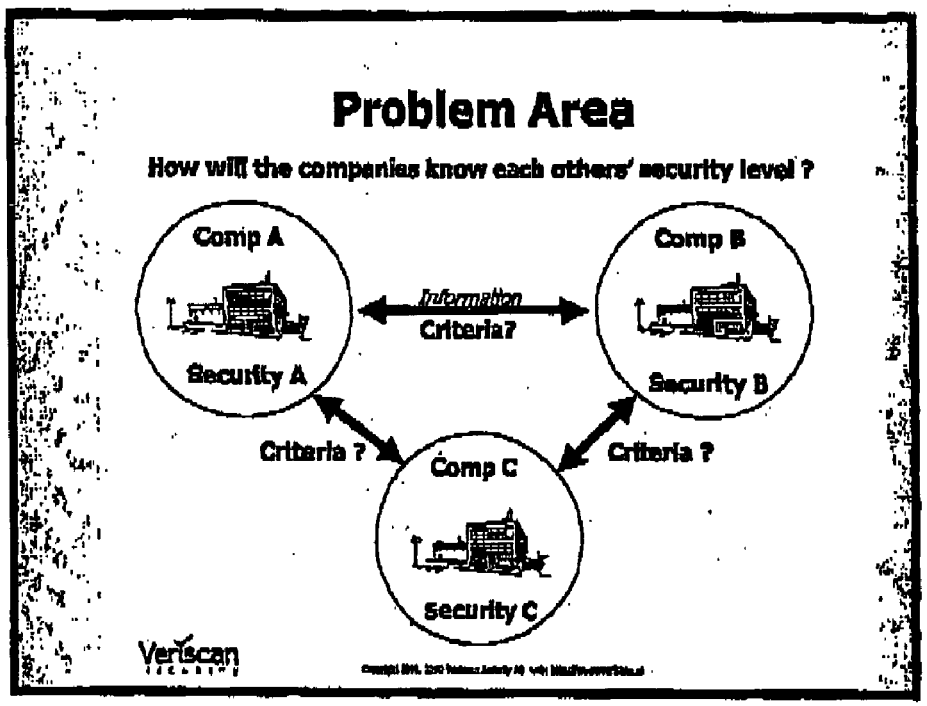
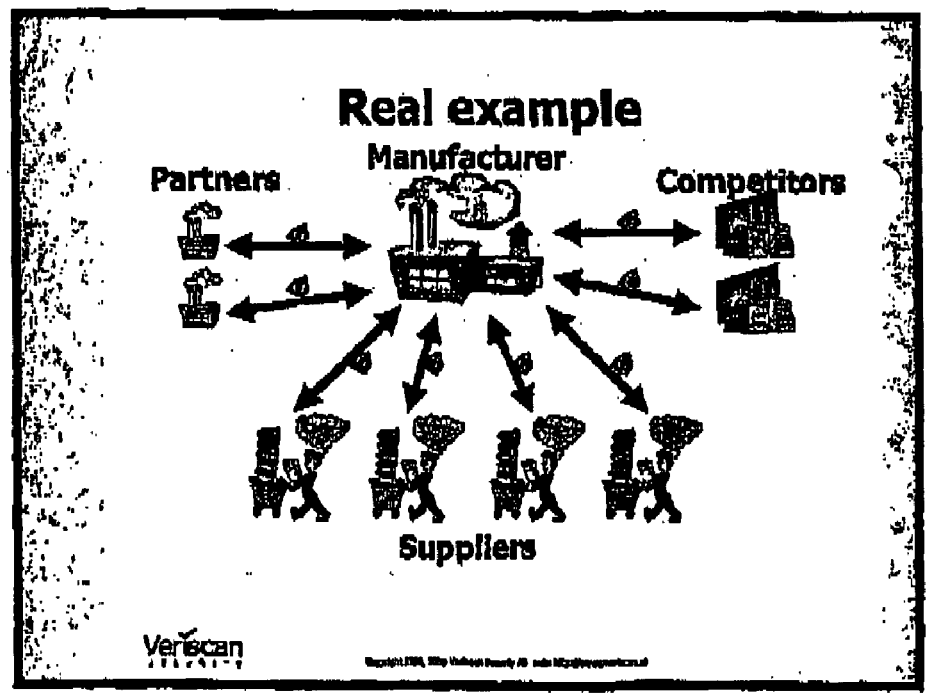

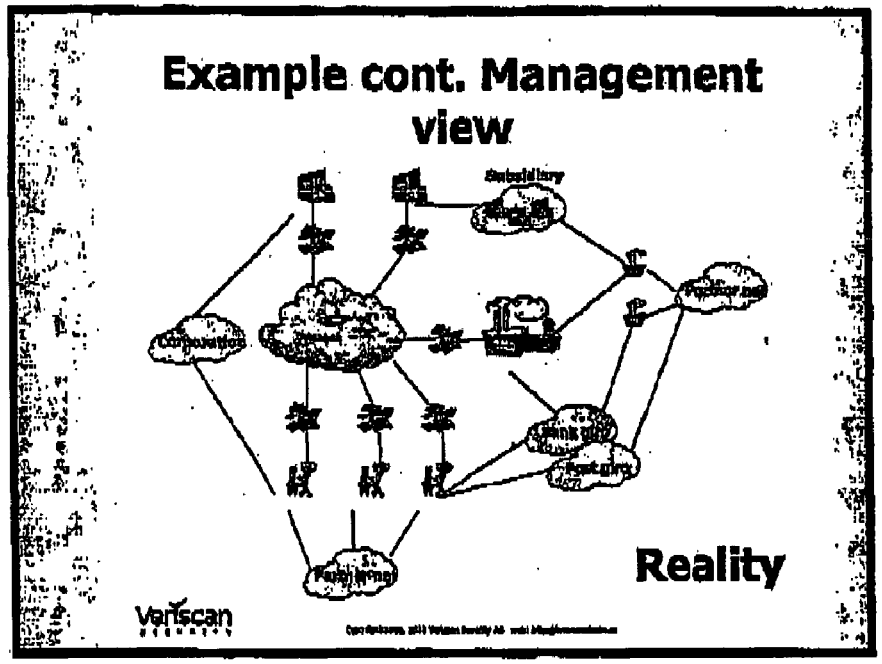
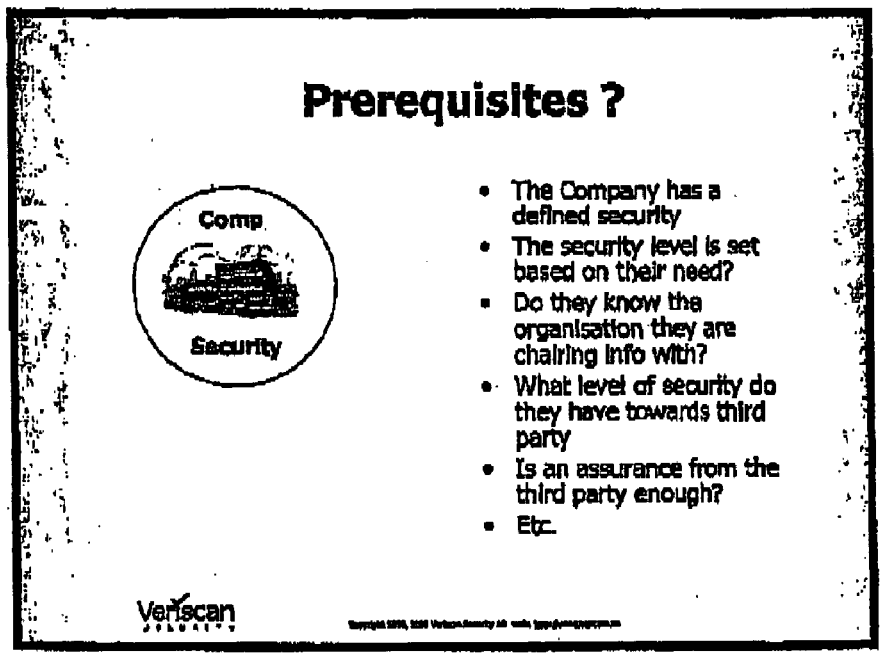

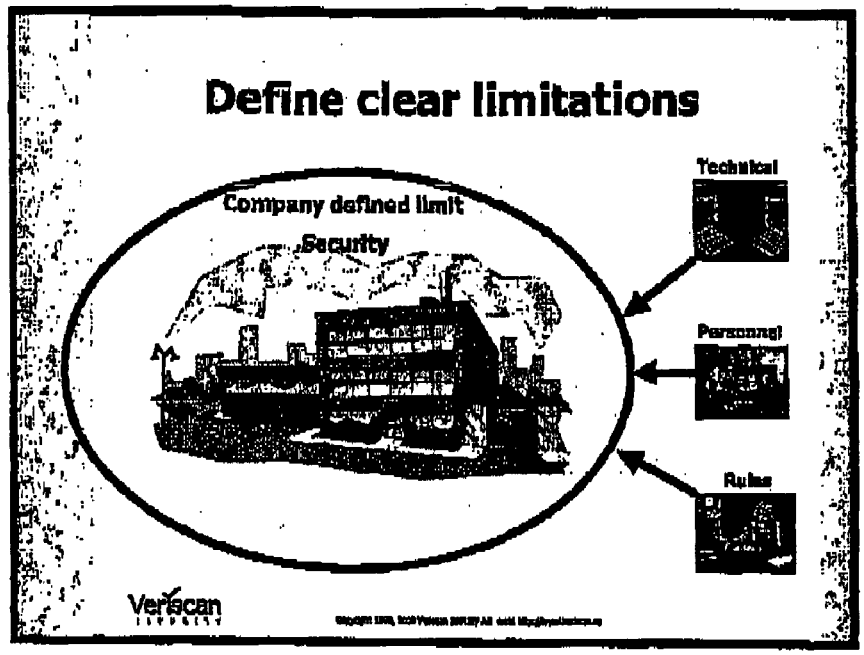
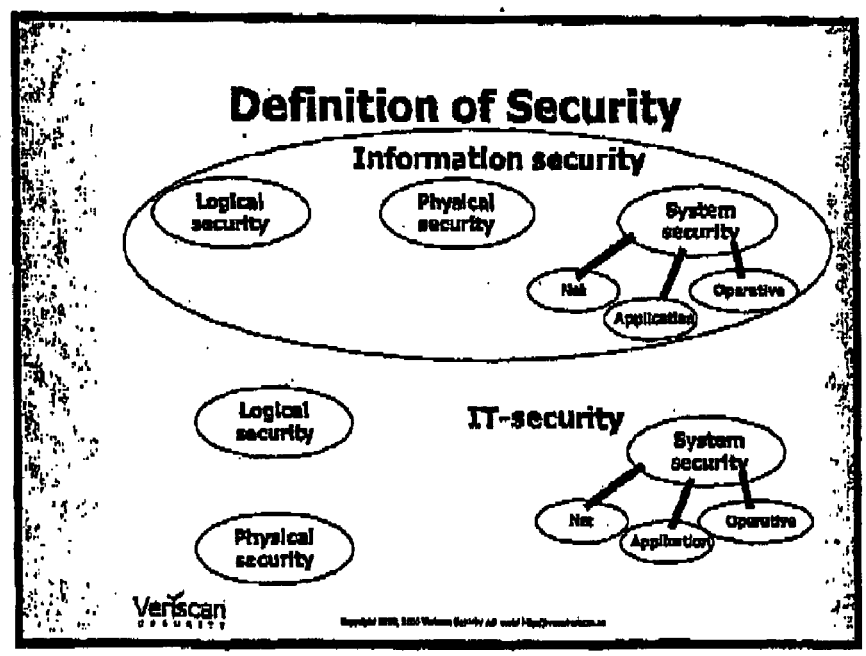

Veriscan Defined Areas

- Logical Security
  - Administrative security

- Physical Security
  - Security facilities, equipment etc

- System Security
  - Security of the IT-system, technical security

System security

- Divided into three sub categories
  - Operative System
    - Security configurations and adaptations
  - Network
    - Net applications, security adaptations
  - Applications
    - Specific applications, known or adapted

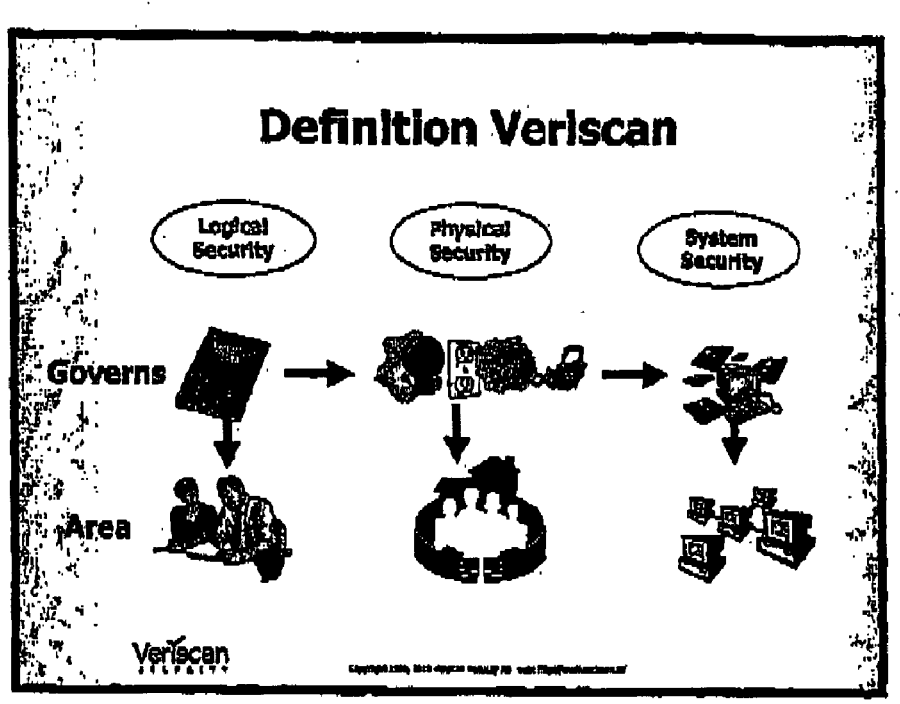
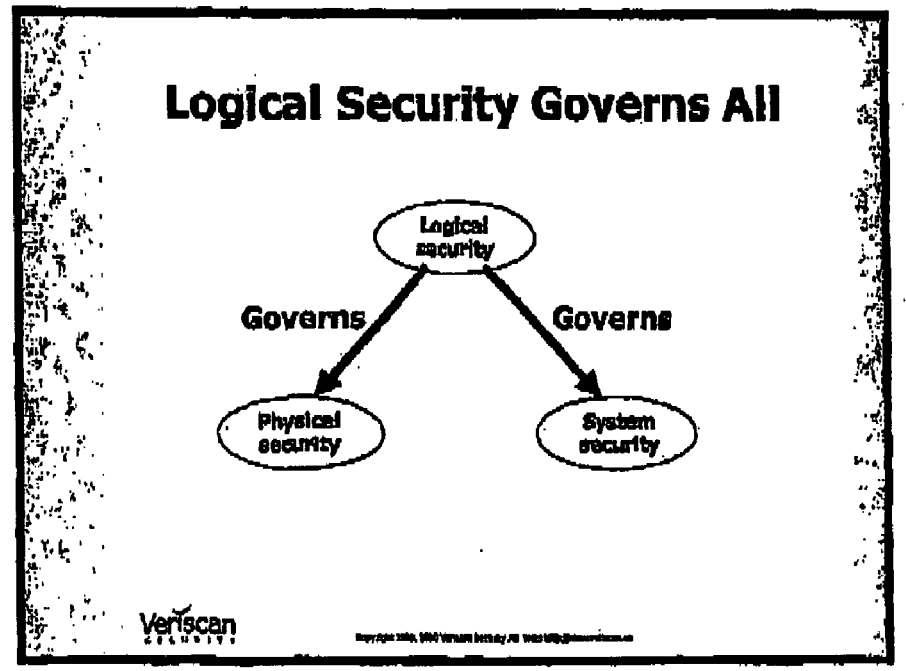

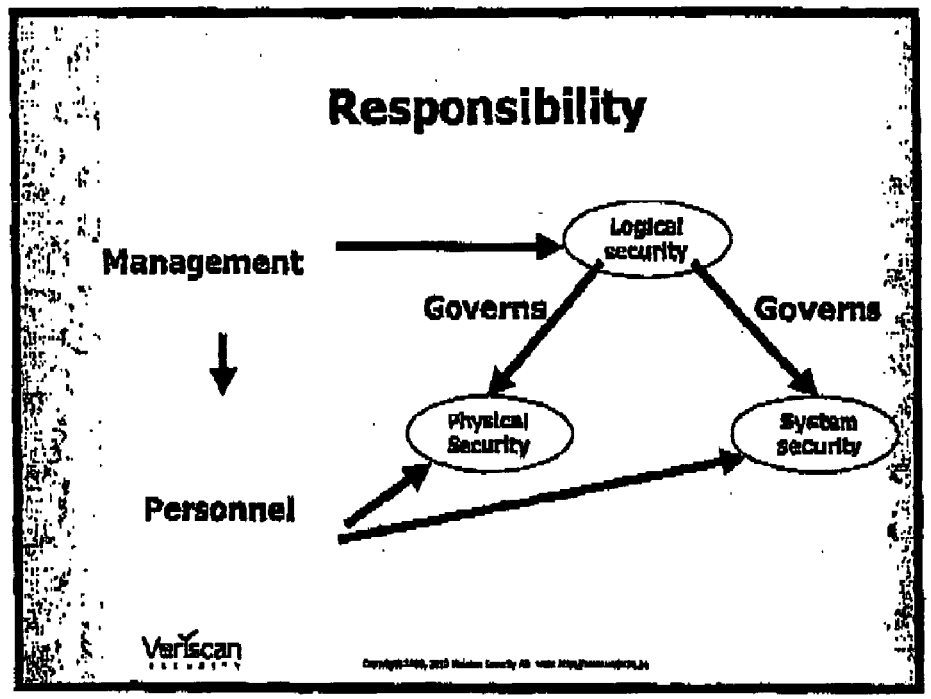
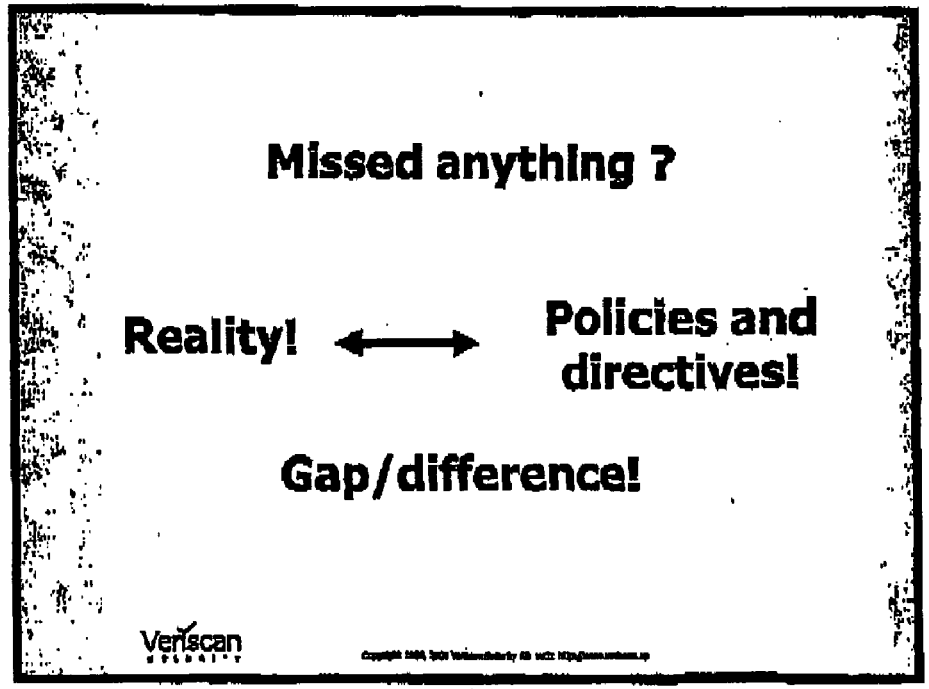

Directive

- Management directives
- Norms
- Laws,  →  Level ?
- Policies
- Market demand and expectations
- Etc..

Level - Rating

- Veriscan introduce a rating on 5 levels
  - Veriscan 1 – Controlled Security
  - Veriscan 2 – Aware Security
  - Veriscan 3 – Market related security
  - Veriscan 4 – High Security
  - Veriscan 5 – Very high security

Levels are version based according to time

Veriscan Rating

- Why five levels?
  - A reference norm, Rating 3
  - Discrepancy from the reference norm establish additional two levels
  - Another two levels are added to cope with variations.
    - Why?
      - Meet customer demand
      - Different types of organisations do not demand the same level
      - Different organisation functions demands different levels
      The lower levels is never to be compared with a higher

What represents each level?

---

Veriscan 1

Label: Controlled Security

Description:
Control of parts within logical and physical and system security. Basic security is reached. A general IT-policy exists.

Veriscan 2

Label: Aware Security
Description:
Verification control of all areas. Defined documents are in place and are basically in accordance with standards. The security is verified on a rather high level. A control of system security for overall security is done.

Veriscan

Veriscan 3

Label: Market adapted Security

Description:
Control of all areas. Defined documents are in place and are fully in accordance with the referred standards. A total check is conducted on system security where higher classed information should have additional protection.
The organisation is well aware of security and the organisations policy.

Veriscan

Veriscan 

Label: High Security

Description:
Control of all areas. Defined documents are in place and are fully in accordance with referred standards. Additional adjustments are set compared to the referred standards. A total check is conducted on system security where criteria on individual security is included.
The organisation is fully aware of the security and the organisations policy.

Veriscan

Veriscan 

Label: Very High Security
Description:
Control of all areas. Defined documents are in place and are fully in accordance with referred standards. Additional adjustments are set compared to the referred standards and are specific for the organisation. A total and adaptive check is conducted on system security. The criteria on individual security is highly emphasised.
The organisation is fully aware of the security and the organisations policy.

Veriscan

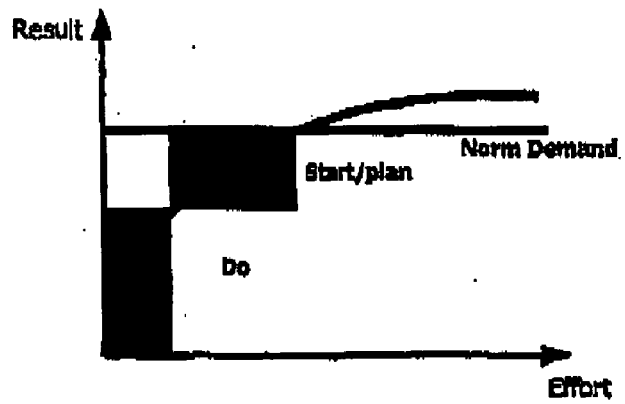

How can the rating method be used?
- Two Ways:
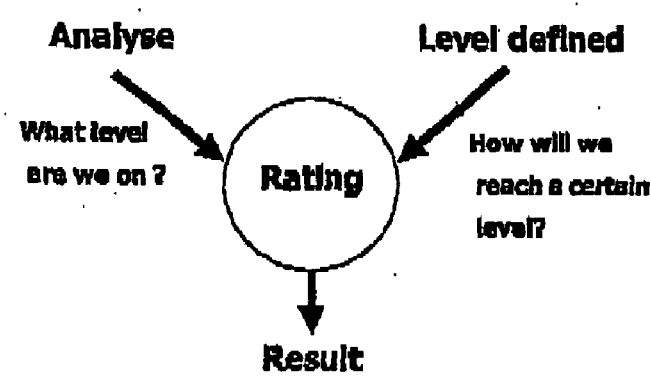
Use cont.
- Analysis: - Passive role
  - Measurement according to Veriscan Rating gives level
  - Presentation of result
- Defined level — Active role
  - Includes a analysis
  - Results is used to lead to a certain deserved level

Rating for different types of organizations?

- Veriscan Rating is not intended to support adaptations to different types of industries. The different levels should preferably cover most cases:
  - The higher levels are generally speaking aimed at larger organisations with legal or large economical risks.
  - The lower is aimed at smaller or where the risk is lower.

- Examples
    - Health Care – Veriscan 2-4
    - R&D – Veriscan 3-5
    - Manufacturing – Veriscan 1-3

- IMPORTANT! All levels should be used irrespectively of type of Industry

Analyse, method ?

- Preset:
  - Quotation procedure
  - Assignment specification
    - Written acceptance of the assignment
  - Initial visit/inspection
    - Presentation of the rating to involved personnel
    - Inspections of facilities
    - Carried out according to Veriscan Rating
    - All documentation related or requested should be submitted
  - Selection for interview
    - According to Veriscan Rating methodology
  - Network Topography
  - Submitted layouts and specifications.
    - Completed by Veriscan method prerequisites

General analyse method cont.

- Phase 0: Submitted Information
- Phase 1: Document scrutinize
- Phase 2: Interviews
- Phase 3: Inspection
- Phase 4: System test
- Phase 5: Creating Results Veriscan

How is it done?

- Document templates
  - Word/Excel
  - Interviews
  - Document scrutiny

- Applications
  - Freeware UNIX/NT
  - A&P tester
  - Physical system tests

Veriscan

Procedure
- Logical security
  - Document scrutinyy
  - Interviews
- Physical security
  - Document scrutinyy
  - Interviews
  - Inspection
  - Social attack
- System security
  - Veriscan Toolbox
  - A&P with known tools
  - Inspections of system security settings
Veriscan Rating structure
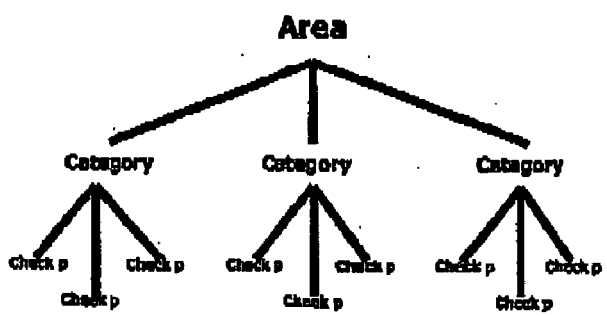
Measurement is conducted on each Check Point !

Example, Physical Security
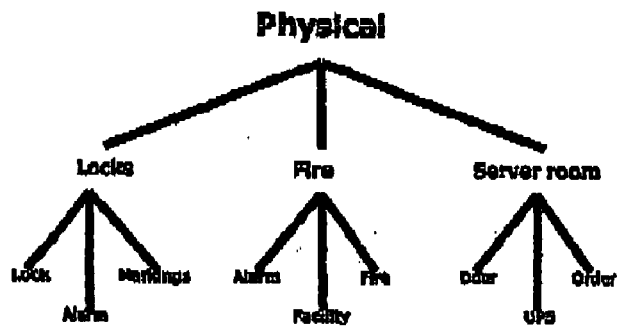
Terminology of Veriscan Rating
- In order to keep a clear and distinct developing process there is some basic terminology laid down
- These are predominantly constructed to ease the developing work and usage

Category weight

- Each area is divided into Categories

- The Category Wight reflect how important the category is relatively to the other categories within the area

- This is used for a part of final result

Category weight Example

- Logical Security:
  - Policy documentation – CW:5
  - Handling documentation – CW: 4
- Physical Security:
  - Fire protection– CW:4
  - Wiring – CW:3
- System Security
  - Network – Mail services – CW:4
  - Operative system: Register(Win NT4) – CW:4

Organisation Position weight

- Reason: From a security perspective are different positions unequally important.
- Greater Responsibility=Higher Position=More Weight
- Selections of respondents
  - 5 position categories:

- 1. Normal user of IT
  - 2. Normal user of IT with responsibility
  - 3. Personnel with specific responsibility of IT
  - 4. Personnel with managing responsibility for IT
  - 5. Personnel with total responsibility for IT

Organisation Position cont.

- The sample of organisation positions must reflect the organisation structure
- Positions shall not be over represented
- A balance of respondents is a must

Organisation Positions Personnel

Every sub level must cover the one above

Rule: No Category may be over represented in the sample so that this may effect the results in any direction.

Veriscan

Non representative sample

- First: To cover all organisation positions is an objective
- But this may cause an unbalance
  - Solution: Fictive respondents are included and their reply is based on the real one's mean value.

Fictive

Veriscan

Checkpoint weight

- Specifies how important the checkpoint is in relative terms to all other checkpoints within the
- The weight is created by a calculation of: Threat – Probability – Consequence
- A five level scale is used
  - 1. Checkpoint is of minor importance
  - 2. Checkpoint is of some importance
  - 3. Checkpoint is important
  - 4. Checkpoint is very important
  - 5. Checkpoint is of major importance Veriscan

Checkpoint weight Examples

- Policy documentation:
  - Management approval – cp:5
  - Managing documentation – cp: 4
- Fire Protection:
  - Automatic alarm – cp:4
  - Fire Extinguishers – cp:3
- Mail-services
  - SMTP – cp:4
  - POP – cp:3

Veriscan

Checkpoint result

- As the scale is the same for all three areas must the result be given different meaning.

- Logical security – Interviews, documentation
- Physical security – Interviews, inspection
- System security – Inspection

Checkpoint result cont.

- Logical security

| 0 | 3 | 5 |
| Do not know | Passed | Passed well above norm |

- Physical security

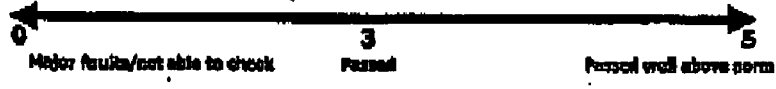

| 0 | 3 | 5 |
| Major faults/not able to check | Passed | Passed well above norm |

- System security

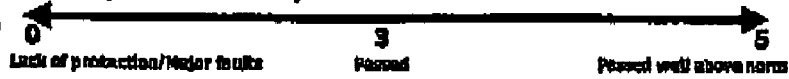

| 0 | 3 | 5 |
| Lack of protection/Major faults | Passed | Passed well above norm |

Checkpoint result < 1

- A Checkpoint result < 1 has a special meaning.
- If a < 1 is registered on a Checkpoint will this lead to that the rating is not achieved independently if the overall result is above the level for approval for the rating

Effort weight

- If a breach in security exists, How is this described in the Veriscan Concept ?
- Effort weight describes:
  - To what extent the organisation must put work efforts to correct the breach
  - To what extent must the organisation put funds to correct the breach

Effort weight cont.

- The Effort weight is like the Checkpoint result on a six grade scale, of which the six grade is merely a constructed level.

0 — No effort   3 — Medium Effort   5 — Major Effort effort weight, levels

0. No effort is required to create an Passed check-point

1. The effort required is of low time and low investment

2. The effort required is either of low time or low investment

3. The effort required demands a medium work load (and can often be fixed by internal staff)

4. The effort will either require high workload or a high investment

5. The effort will require both a high workload and a high investment

Effort weight Example

- Checkpoint: Policy documentation (Logical)
  - Q?: If the policy documentation includes several flaws, hoe high effort is needed to cover them ?
  - Answer: Effort weight=5, meaning that heavy resources must be put into this both in terms of internal work and money .
  - Checkpoint: Power supply cable arrangements, Computer room (Physical)
  - Q?: If the cable arrangements are in a bad state, wow big effort is required to fix this?
  - Reply: effort weight=1, Low internal staff time is needed effort weight, example cont.

- Checkpoint: Information spread (Logical)
  - Q?: If the spread of information is lacking, how much effort is needed to increase the spread ?
  - Reply: effort weight=3, Resources must be put either on personnel or investments but these are regarded as medium (internal solution is much likely)
  - Checkpoint: Topology-network (System)
  - Q?: If the topology is lacking(old and easy to tap) how much effort is needed to correct this ?
  - Reply: effort weight=5, Large personnel investment as well as economical

Calculations

| Org Position weight | | 3 | 3 | 3 | 2 | 2 | 1 | 1 |
|---|---|---|---|---|---|---|---|---|
| Cat. Weight | 5 | CpW | | | | | | |
| Checkpoint 1 | 2 | 2 | 1 | 3 | 3 | 5 | 2 | 2 |
| Checkpoint 2 | 4 | 2 | 2 | 0 | 4 | 2 | 1 | 0 |
| Checkpoint 3 | 4 | 1 | 3 | 2 | 4 | 5 | 0 | 1 |
| Checkpoint 4 | 2 | 3 | 2 | 1 | 3 | 2 | 2 | 3 |
| Checkpoint 5 | 2 | 0 | 0 | 2 | 3 | 3 | 1 | 3 |
| Checkpoint 6 | 2 | 0 | 2 | 2 | 5 | 3 | 4 | 0 |
| Checkpoint 7 | 5 | 2 | 1 | 2 | 2 | 3 | 4 | 1 |
| Checkpoint 8 | 3 | 2 | 2 | 2 | 1 | 1 | 1 | 1 |

Results

- Concept result    Scale 0-5
- Area result    Scale 0-5
- Category result    Scale 0-5
- Checkpoint result    Scale 0-5
- Org Position result    Scale 0-5

In final version is a comparison between different results easy to do!

Results cont.

- What do the result represent?
  - If a total result is lower than 3.0, is the organisation not Passed according to the level that the analysis was conducted on.
  - If the total result is 3.0 or higher, is the organisation Passed on the level that the analysis was conducted on and will be rated accordingly.

Veriscan

Result< 3.0

- The total result may when a value lower than 3.0 still be used as a rating result.
  - Every level is a part of the higher level:

- A result conducted on level 3 that is higher than .....mean that the organisation can be Passed and rated on Veriscan 2 level.

- But this does not work the other way. A result of 4.2 does not mean Passed and rated on Veriscan 4 level.

Veriscan

Presentation of Results

- Receiver:
  - Management: - Type A – Documentation A
  - Personnel: - Type B – Documentation B
  - Other forum: – Type C – Documentation C
- The concept will be delivered in electronic format that enables creation of different presentations according to need Veriscan

Presentation Concept results

- The Concept results is presented in two different ways:
  - With Area weights on the Checkpoints
  - Without Area weights on the Checkpoints
- Why ?: The weights represents what is more and less important within an Area.
- Thus: If a result is higher with that if without is the organisation is better on important checkpoints
- If a lower result is the organisation not good at important checkpoints.
- Provides: Guide for Priority Veriscan

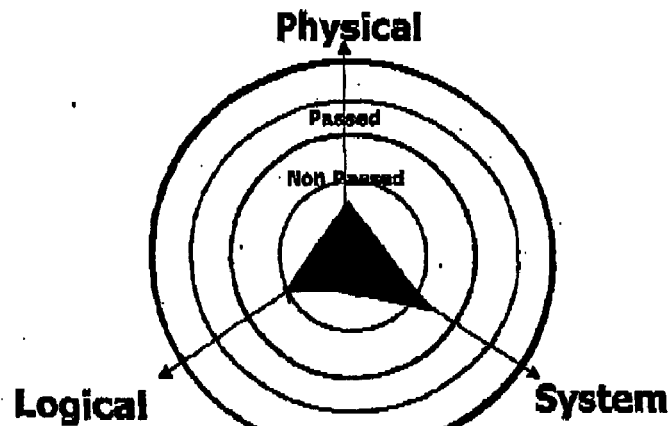

Presentation Checkpoint result

- The total presentation of the result reveals what area that is Passed and not and also how much the results diversifies from the boarder line result (3.0)
- But to analyse the security breaches in depth must the checkpoint results be presented and analysed.

Checkpoint results are also presented in diagram format but from another perspective that enables both diversion and priority.

Checkpoint result diagram

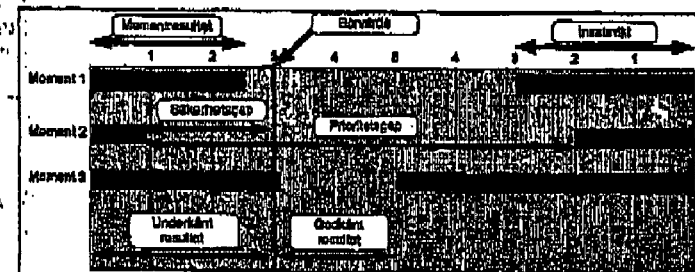

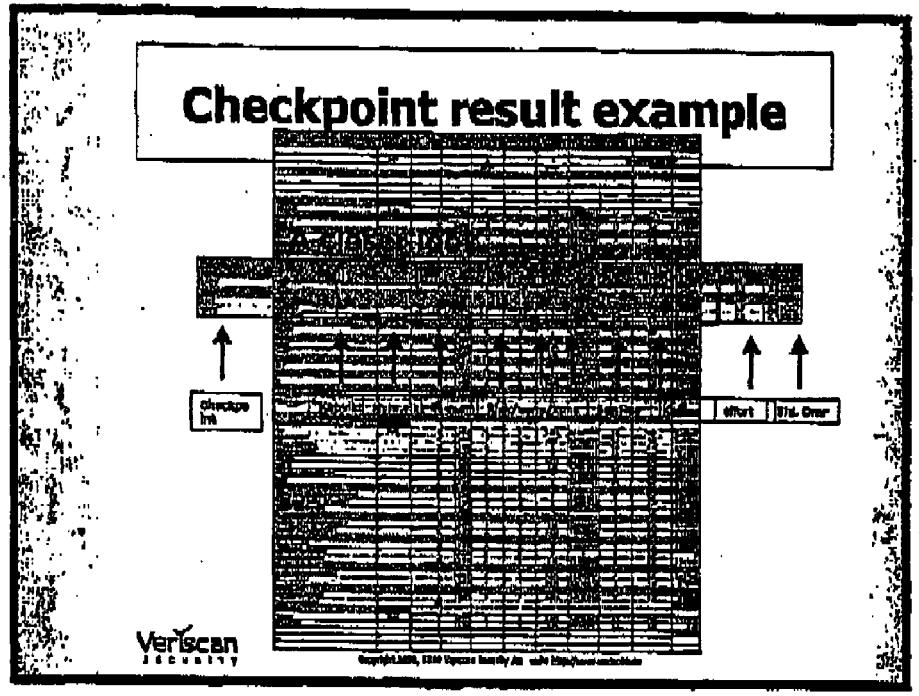

The invention claimed is:

1. A method for measuring a numerical information security level at an organization for standardized comparison to numerical information security levels of other organizations, the method comprising:

performing measurements on specific information security issues within three different security areas of the organization comprising the security areas logical information security, system information security, and physical information security, wherein each area is divided into a subset of categories, each category is divided into a subset of checkpoints, and each checkpoint relates to a specific information security issue, wherein said specific information security issues within the area logical information security comprise guide lines and policies, wherein said specific information security issues within the area system security comprise technical security of IT-systems, and wherein said specific information security issues within the area of physical information security comprise burglar alarm and fire alarm;

treating the specific information security issues as checkpoints;

using various sources, including current standards, to gather an information set to state a predefined norm security level;

using the norm security level to create different lower and higher numerical security levels within each checkpoint;

using the measurements and having a rating reviewer give a numerical grade to each checkpoint;

using mathematical operations to calculate a result based on the numerical checkpoint grades; and using the result to indicate which numerical information security level is fulfilled, wherein the result presents a relative rating regarding information security within each area that is comparable between different organizations and also presents comparable ratings regarding different checkpoints within the organization, wherein a software tool is used to graphically present the result, wherein the graphic presentation includes a graphical tool for decision making, wherein the graphical tool comprises at least one diagram presenting:

a first scale that reaches in a first direction along a first axis, at least two presentations of the numerical checkpoint grades of a first checkpoint and a second checkpoint respectively, wherein the numerical checkpoint grades are graphically represented along the first scale, and a second scale arranged along the first axis, wherein said second scale reaches in a direction opposite to the first scale and represents a relative value of input needed to at least one of increase the grade of each presented checkpoint, and reach a certain discrete numerical information security level.

2. The method of claim 1, wherein the information set further comprises at least one of guidelines and recommendations regarding security, and wherein the information set is used to set the numerical checkpoint grades.

3. The method of claim 2, wherein the numerical checkpoint grades are presented on an analogue scale, whereby the result is also presented on an analogue scale.

4. The method of claim 2, wherein results from different security areas are compared to evaluate which area needs attention.

5. The method of claim 1, wherein the mathematical operations comprise adding up the numerical checkpoint grades from each checkpoint.

6. The method of claim 1, wherein the numerical information security levels are used to meet the need for different types of information security levels and requirements, to enable one organization type to choose a security level different from another organization type depending on under which regulations, legislation, or branch of trade the one organization type is operating.

7. The method of claim 1, wherein the numerical information security levels are discrete and represent the level of demands that are put onto an organization, both in the amount of demands and the level of demand fulfillment.

8. The method of claim 7, wherein the number of discrete numerical information security levels is at least five.

9. The method of claim 7, wherein the number of numerical checkpoint grades is at least five.

10. The method of claim 7, wherein all demands must be completely fulfilled to pass a certain discrete checkpoint grade.

11. The method of claim 1, wherein a final result is calculated only after having set all numerical checkpoint grades within every security area being measured.

12. The method of claim 1, wherein a checkpoint is represented by a property of an information security issue being measured.

13. The method of claim 11, wherein calculating the final result comprises:

applying a weight to the numerical checkpoint grades to calculate weighted checkpoint results;

calculating, for each area, a weighted area result based on the weighted checkpoint results; and calculating the final result based on each weighted area result.

* * * * *